(12) United States Patent
Sautter et al.

(10) Patent No.: US 6,842,271 B2
(45) Date of Patent: Jan. 11, 2005

(54) RAIN SENSOR, IN PARTICULAR FOR A MOTOR VEHICLE

(75) Inventors: Helmut Sautter, Ditzingen (DE); Armin Jerger, Buehl (DE); Frank Wolf, Buehl (DE); Gerhard Hochenbleicher, Fürstenfeldbruck (DE); Vincent Thominet, Morges (CH); Zishao Yang, Erding (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/470,452
(22) PCT Filed: Sep. 17, 2002
(86) PCT No.: PCT/DE02/03487
 § 371 (c)(1),
 (2), (4) Date: Jan. 23, 2004
(87) PCT Pub. No.: WO03/048748
 PCT Pub. Date: Jun. 12, 2003

(65) Prior Publication Data
 US 2004/0113105 A1 Jun. 17, 2004

(30) Foreign Application Priority Data
Nov. 27, 2001 (DE) .......................... 101 58 097
Jun. 28, 2002 (DE) .......................... 102 29 200

(51) Int. Cl.$^7$ .............................. G02B 5/32; G02B 6/42
(52) U.S. Cl. .............................. 359/15; 359/24; 359/19; 359/1; 359/22; 250/573; 250/208.1; 340/602
(58) Field of Search .............................. 359/1, 22, 15, 359/19, 9, 24, 566, 569, 558; 250/573, 208.1; 340/602

(56) References Cited

FOREIGN PATENT DOCUMENTS

| DE | 38 25 663 | 2/1989 |
| DE | 44 13 758 | 12/1994 |
| DE | 195 41 312 | 5/1996 |
| DE | 197 01 258 | 7/1997 |
| DE | 199 43 887 | 3/2000 |
| EP | 0 736 426 | 10/1996 |
| EP | 0 893 317 | 1/1999 |

*Primary Examiner*—Fayez Assaf
(74) *Attorney, Agent, or Firm*—Kenyon & Kenyon

(57) ABSTRACT

A rain sensor for a motor vehicle, having a transmitter emitting radiation, a receiver, and a holographically embodied diffractive element that has a linear-grating-like structure.

14 Claims, 2 Drawing Sheets

RAIN SENSOR, IN PARTICULAR FOR A MOTOR VEHICLE

FIELD OF THE INVENTION

The present invention relates to a rain sensor.

BACKGROUND INFORMATION

Conventional rain sensors include, for example, that of German Patent No. 197 01 258, in which the radiation of a transmitter is coupled into the window of a motor vehicle by a holographically embodied diffractive element, totally reflected at the outer side of the window, and directed or focused onto a receiver by a further diffractive element. In such sensors, the diffractive elements are embodied as volume phase holograms that are introduced into films made of photopolymers.

Such films are complex to produce, expensive to manufacture, and problematic in terms of their environmental properties.

SUMMARY OF THE INVENTION

An example rain sensor according to the present invention may be advantageous in that because of the line-like structure of the diffractive element, it may be more economical to manufacture and a wider spectrum of materials can be used. In addition, the environmental properties, for example, are thereby improved. Larger sensitive areas can moreover be provided, thereby improving the response characteristics of the sensor unit.

It may be advantageous if the element diffracts the radiation into a first and into a minus-first order, since in this fashion two sensitive areas can be achieved with only one transmitter and receiver, with no need to increase the radiation intensity. Additional costs can be saved in this fashion, and the interference resistance further reduced.

A good signal-to-noise ratio of the receiver signal may be achieved by the fact that the element exhibits focusing properties.

A compact sensor may advantageously be obtained if a further element is provided that is partially embodied as a retroreflector. In this fashion the receiver can be positioned in the vicinity of the transmitter, or the transmitter can be used simultaneously as a receiver.

If at least one element and/or one further element is embodied as a multi-layer structure, more-complex beam paths can also be represented in simple fashion.

It is may be advantageous in this context if one element exhibits several structures that are superimposed in one layer.

The elements or the further elements may be positioned on the window of the motor vehicle. It may be advantageous in this context if the diffraction efficiency of an element lies between 20 and 80%, e.g., between 40 and 80%, preferably between 60 and 80%.

Good signals may be represented by the fact that the diffraction efficiency of the element is less than 100%, e.g., less than 90, preferably less than 85%.

In an economical exemplary embodiment of the rain sensor, the latter has more receivers than transmitters, since the transmitters are more cost-intensive than the receivers.

In addition, multiple receivers make possible a more intelligent signal evaluation and thus an improved adaptation of wiper speed to the rain intensity.

DETAILED DESCRIPTION OF EXAMPLE EMBODIMENTS

Figure 1:
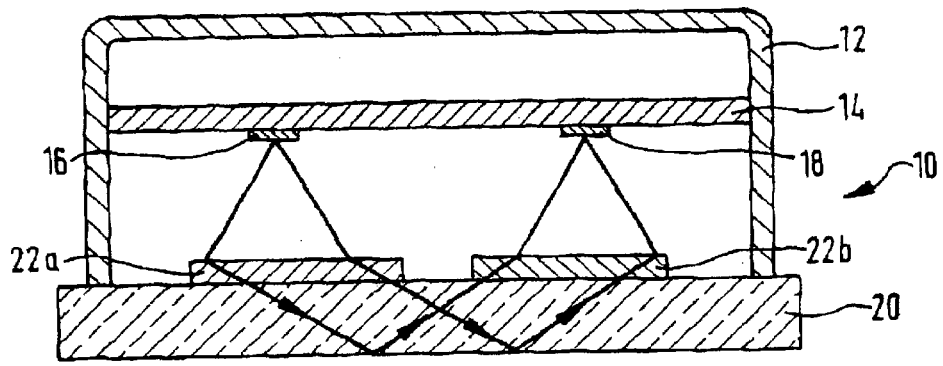
FIG. 1 shows a schematic cross-section of a rain sensor according to an example embodiment of the present invention.

FIG. 1 shows a schematic cross-section of a rain sensor 10 according to an example embodiment of the present invention. It includes a housing 12 in which a circuit board 14 is positioned. Circuit board 14 carries a transmitter 16 and a receiver 18 which are embodied as semiconductor components using SMD technology. Housing 12 sits on a window 20, for example, the windshield of a motor vehicle, and is attached thereon. This may be accomplished, for example, by adhesive bonding or retaining elements such as grooves or lugs, which are positioned on or in window 20 and coact with attachment elements of housing 12.

Diffractive elements 22a, 22b, which are made up of a film equipped with a holographic linear grating, are adhesively bonded onto window 20. One of diffractive elements 22a is positioned in the region on window 20 in which the radiation of transmitter 16 directly strikes window 20. Film 22a is embodied in such a way that it couples the radiation of transmitter 16 into window 20, so that the radiation is totally reflected at the clean and dry glass-air interface facing away from rain sensor 10.

Second diffractive element 22b is positioned at the point on window 20 at which the radiation of transmitter 16 emerges from window 20 after total reflection. The linear grating is selected in such a way that the totally reflected radiation is deflected, e.g., is focused, toward receiver 18.

Figure 2:
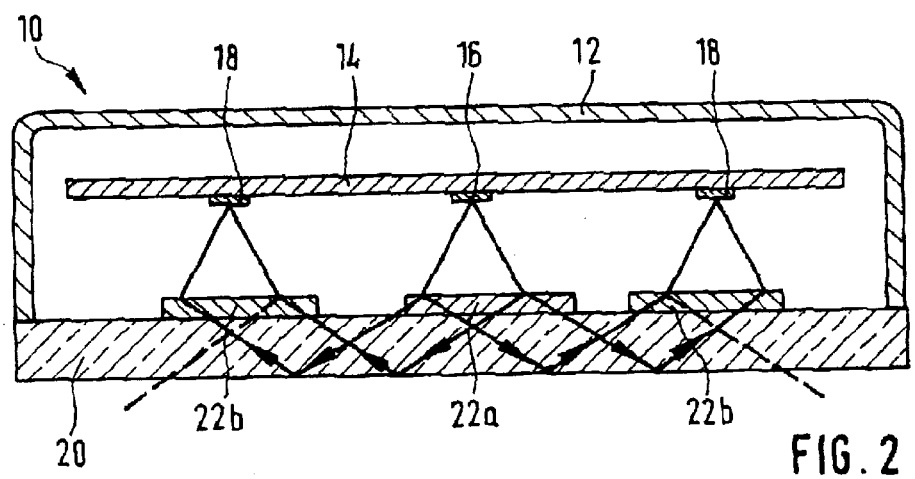
FIG. 2 shows a variation the sensor according to the example embodiment of the present invention shown in FIG. 1.
Figure 7:
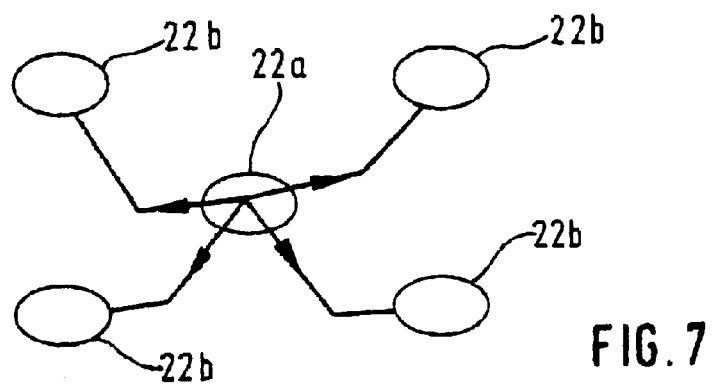
FIG. 7 shows another example positioning of the diffractive elements in a variation of FIG. 6.

FIG. 2 depicts a further example embodiment of rain sensor 10 shown in FIG. 1. Here one transmitter 16 and two receivers 18 are positioned on circuit board 14. In the region of transmitter 16, diffractive element 22a having a linear grating is positioned on window 20. The linear grating is once again embodied in such a way that the radiation of transmitter 16 is directed into the first and minus-first diffraction orders. Corresponding thereto, further diffractive elements 22b are positioned in the region of receiver 18 in such a way that the light from the first and minus-first diffraction orders is directed onto receiver 18. Cross-shaped measurement paths may also be implemented by suitable selection of element 22a (FIG. 7).

Figure 3:
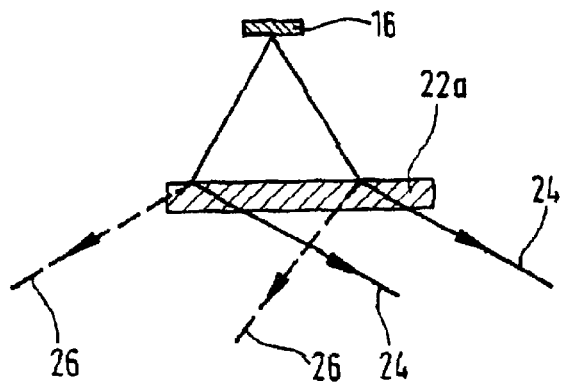
FIG. 3 shows a schematic cross-section of a beam path through a diffractive element according to an example embodiment of the present invention.

FIG. 3 depicts transmitter 16 and diffractive element 22a of FIG. 2 in detail. Diffractive element 22a is embodied as a hologram film having a linear grating, arranged so that the radiation proceeding from transmitter 16 perpendicularly onto the hologram film is diffracted into first order 24 and minus-first order 26. This diffraction effect at the grating is commonly known in physics, and described in numerous textbooks. The first and minus-first diffraction orders have the same intensity. The zero order, into which no intensity also may flow if applicable, is located in the transmission direction, i.e., in the straight-line direction viewed from transmitter 16.

On the receiver side, diffractive element 22b is configured in such a way that only first-order light is directed to receivers 18, and the other orders, i.e., the minus-first order or higher orders, are blocked out. This is made possible, for example, by the use of blazed gratings or so-called holographic lenses.

Diffractive elements 22a, 22b may moreover possess focusing properties, for example, in order to convert the divergent, wedge-shaped beam of transmitter 16 into one having a cylindrical cross section. In diffractive elements 22a of this kind, minus-first order 26 is in some circumstances divergent, and can also be used as useful radiation by using suitable additional actions.

Figure 4:
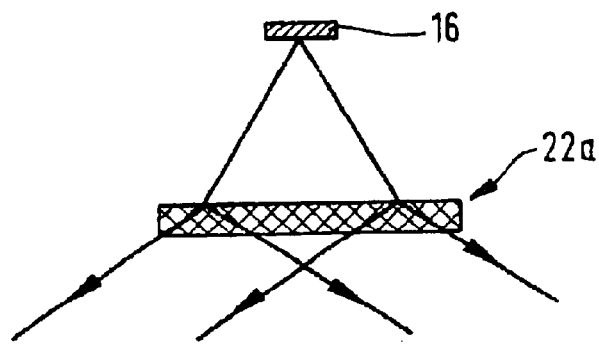
FIG. 4 shows a variation of the beam path of FIG. 3.
Figure 5:
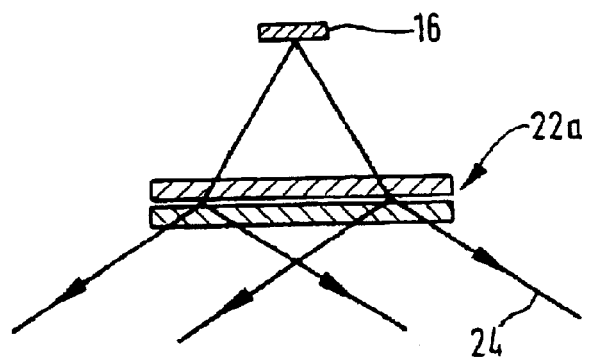
FIG. 5 shows a variation of the beam path shown in FIG. 4, with a multi-layer diffractive element.
Figure 6:
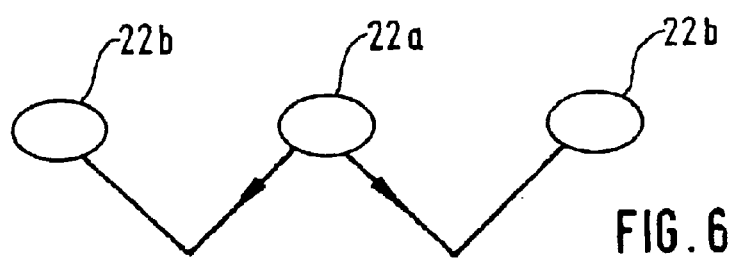
FIG. 6 shows an exemplary positioning of the diffractive elements of a sensor according to FIG. 2.

FIGS. 4 and 5 depict a variation of the example embodiment shown in FIG. 3. Diffractive element 22a here is made up of a superimposition of diffractive structures, each rotated 180 degrees with respect to one another, each of which diffracts predominantly into the first order. In FIG. 4, both structures are superimposed in one layer. This may be achieved, for example, by double exposure of a hologram. As shown in FIG. 5, however, these two structures may also be produced in separate layers and then, for example, laminated onto one another. This results in two first-order sub-beams, diffracted in opposite directions and focusing in a desired fashion. The minus-first-order rays that are also present are not utilized here. FIG. 6 shows an assemblage of diffractive elements 22a, 22b. The path of the radiation of transmitter 16 is indicated schematically by the arrows. Center diffractive element 22a is positioned in the region of transmitter 16, and diffracts the radiation in the first order, via the totally reflecting glass-air interface, to external receivers 18.

FIG. 7 depicts a variation of the example embodiment shown in FIG. 6. Five diffractive elements 22 are shown here. Four of these five diffractive elements 22a, 22b are positioned in the shape of a square in whose center fifth diffractive element 22a is positioned. The transmitter is positioned in the region of fifth diffractive element 22a and directs radiation into the four outer diffractive elements 22b. Outer diffractive elements 22b positioned in the region of receiver 18 can of course also be positioned, for example, in the shape of a rectangle, in the shape of a rhombus, or in the shape of a triangle or another geometric shape. The number of linear structures superimposed in central diffractive element 22a of transmitter 16 is, however, equal to the number of receivers 18 that are present.

Elements 22b may also be embodied as retroreflectors, and may radiate the radiation back into the region of the transmitter, where receiver 18 is then positioned. In addition, elements 22b may also direct the radiation toward a shared receiver 18, so that, for example, two elements 22b positioned next to one another guide the radiation onto one shared receiver 18.

What is claimed is:

1. A rain sensor comprising:

at least one transmitter configured to emit radiation;

at least one receiver configured to receive radiation of the transmitter; and at least one holographically embodied diffractive element;

wherein the element has a linear-grating structure; and wherein the rain sensor includes more receivers than transmitters.

2. The rain sensor according to claim 1, wherein the rain sensor is configured to be used in for a motor vehicle.

3. The rain sensor according to claim 1, wherein the element is configured to diffract the radiation into a first and into a minus-first order.

4. The rain sensor according to claim 1, wherein the element is configured to exhibit focusing properties.

5. The rain sensor according to claim 1, further comprising:

at least one further element that is at least partially configured as a retroreflector.

6. The rain sensor according to claim 5, wherein at least one of the at least one element and the at least one further element has a multi-layer structure.

7. The rain sensor according to claim 5, wherein at least one of the at least one element and the at least one further element includes several structures that are superimposed in one layer.

8. The rain sensor according to claim 5, wherein at least one of the at least one element and the at least one further element is positioned at least one of in and on a window of the motor vehicle.

9. The rain sensor according to claim 5, wherein at least one of the at least one element and the at least one further element has a diffraction efficiency of 20 to 80 percent.

10. The rain sensor according to claim 9, wherein the diffraction efficiency is 40 to 80 percent.

11. The rain sensor according to claim 10, wherein the diffraction efficiency is 60 to 80 percent.

12. The rain sensor according to claim 5, wherein the diffraction efficiency of at least one of the at least one element and the at least one further element is less than 100 percent.

13. The rain sensor according to claim 12, wherein the diffraction efficiency is less than 90 percent.

14. The rain sensor according to claim 13, wherein the diffraction efficiency is less than 85 percent.

* * * * *

UNITED STATES PATENT AND TRADEMARK OFFICE
CERTIFICATE OF CORRECTION

PATENT NO. : 6,842,271 B2
DATED : January 11, 2005
INVENTOR(S) : Helmut Sautter et al.

It is certified that error appears in the above-identified patent and that said Letters Patent is hereby corrected as shown below:

Column 2,
Line 6, change "a variation the sensor" to -- a variation of the sensor --.

Column 4,
Line 18, change "used in for a motor vehicle." to -- used in a motor vehicle. --.

Signed and Sealed this

Sixteenth Day of August, 2005

JON W. DUDAS
*Director of the United States Patent and Trademark Office*